United States Patent
Matsunaga et al.

[11] Patent Number: 5,007,272
[45] Date of Patent: Apr. 16, 1991

[54] TENSION ROLLER

[75] Inventors: Douglas S. Matsunaga; Jan W. Slabowski, both of Schiller Park; Tadeusz Marecki, Chicago, all of Ill.

[73] Assignee: Braner, Inc., Schiller Park, Ill.

[21] Appl. No.: 433,754

[22] Filed: Nov. 9, 1989

[51] Int. Cl.⁵ .............................. B21B 31/08
[52] U.S. Cl. ...................... 72/226; 72/238; 226/195; 242/75.2
[58] Field of Search ............... 72/226, 238; 226/168, 226/179, 189, 190, 195; 242/75, 75.2, 75.3

[56] References Cited

U.S. PATENT DOCUMENTS

| | | | |
|---|---|---|---|
| 2,775,151 | 12/1956 | Schumacher | 72/226 |
| 3,061,226 | 10/1962 | Kegg | 242/75.3 |
| 3,197,992 | 8/1965 | Taniguchi | 72/251 |
| 3,386,679 | 6/1968 | Foulon et al. | 226/195 |
| 3,854,672 | 12/1974 | Tilban | 242/75.2 |
| 4,119,256 | 10/1978 | Vogtmann et al. | 226/194 |

FOREIGN PATENT DOCUMENTS 2816993 10/1979 Fed. Rep. of Germany ........ 72/226

Primary Examiner—Lowell A. Larson
Assistant Examiner—T. C. Schoeffler
Attorney, Agent, or Firm—Thomas J. Dodd

[57] ABSTRACT

A machine which applies tension to a strip of steel which has been passed through a slitter. The machine includes two sets of rollers which engage the slit material to maintain tension. The rollers are slidable in the machine frame to allow for rapid changing of the rollers to accommodate various types of slit material.

8 Claims, 3 Drawing Sheets

TENSION ROLLER

FIELD OF THE INVENTION

This invention relates to a tension roller which has special application to a tensioning machine for slit steel.

BACKGROUND OF THE INVENTION

Steel slitting lines often include tension rollers positioned between the slitter and the recoiler. These tension rollers are used to maintain tension on the slit steel prior to the recoiling operation and ensure that the coils are tightly wrapped.

Previously, tension rollers of this sort utilized a single pair of rollers to engage the steel. Because many types of rollers are needed to accommodate varying types and grades of steel, the prior tension roller machines required replacement of the rollers or the entire machine to accommodate a run of a different type or grade of steel. This resulted in extra down time of the line with a resultant loss of revenue to the steel processor.

SUMMARY OF THE INVENTION

The tension roller machine of this invention includes two or more sets of tension rolls mounted to a movable frame. When a different type or grade of steel is to be processed which requires that a different type of tension roll be used, the machine operator may quickly slide the new tension rolls into position by use of a conventional lifting device, such as a screw jack or hydraulic cylinder.

Accordingly, it is an object of this invention to provide a tension roller machine which includes a plurality of sets of rollers.

Another object is to provide a tension roller which decreases the down time of the slitting line.

Another object is to provide for a tension roller machine which can be quickly adapted for use with many different types and grades of slit steel.

Other objects will become apparent upon a reading of the following description.

BRIEF DESCRIPTION OF THE DRAWINGS

A preferred embodiment of the invention has been depicted for illustrative purposes only wherein.

DESCRIPTION OF THE PREFERRED EMBODIMENT

Figure 1:
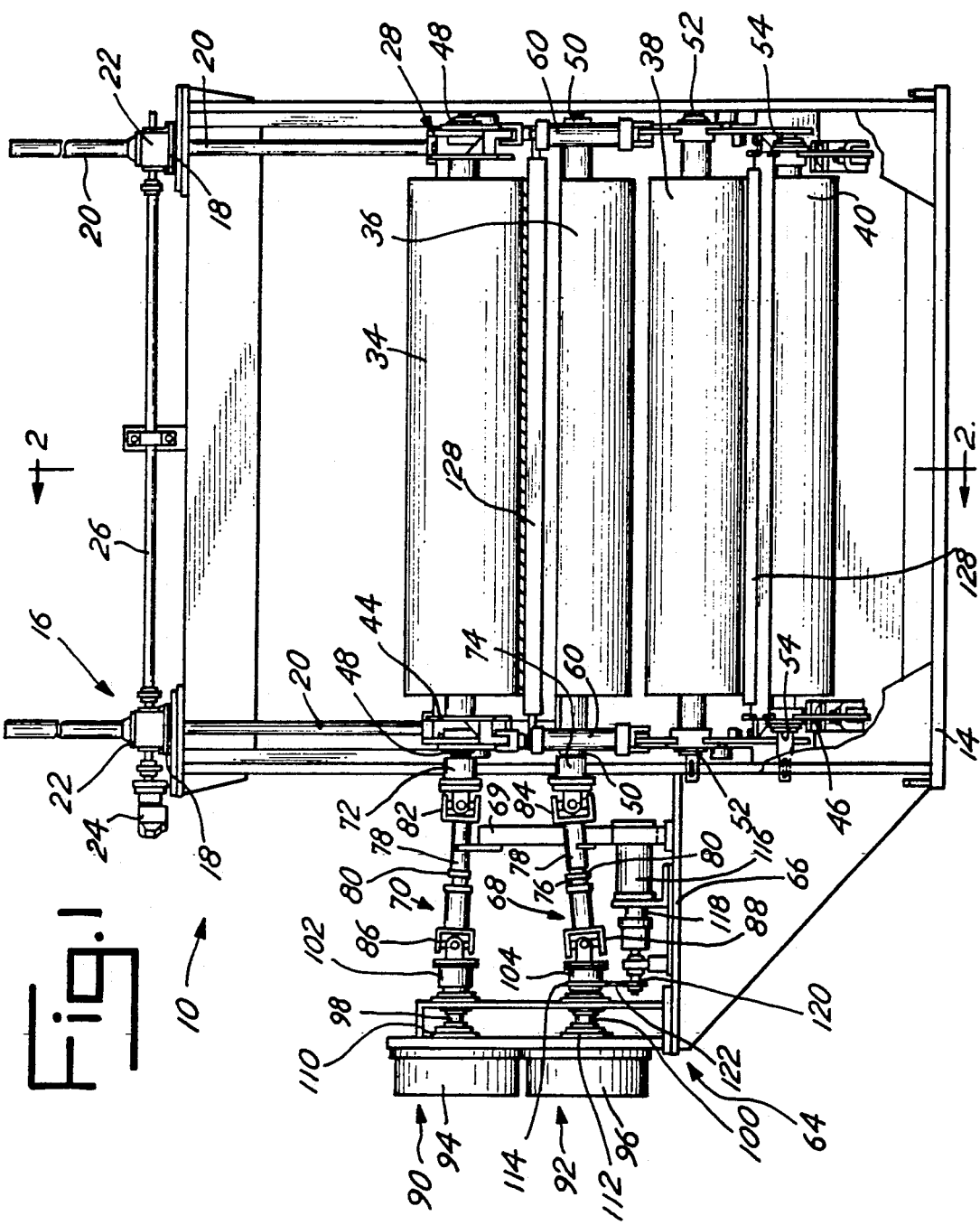
FIG. 1 is an end view of the tension roller machine with one set of tension rollers in an operating position.

The preferred embodiment herein described is not intended to be exhaustive or to limit the invention to the precise form disclosed. It is chosen and described to explain the principles of the invention and its application and practical use so that others skilled in the art might utilize its teachings.

Referring now to the drawings, reference numeral 10 refers generally to the tension roller machine of this invention. Machine 10 is generally used in a steel slitting line and is positioned along the line between a slitter (not shown) and a recoiler (not shown) All elements of the slitting line are items known to those skilled in the art and are not illustrated here for purposes of clarity. Machine 10 is used to tension slit steel material 12 prior to recoiling to allow the formation of tightly wrapped coils.

Machine 10 generally includes a main frame 14. A pair of lifting devices, such as screw jacks 16 are connected to main frame 14 through mounting plates 18. Each screw jack 16 includes vertically oriented rod 20 which extends through jack housing 22 and is connected thereto in a common manner to allow the rod to move relative to the housing. A motor 24 is coupled to one jack 16 to drive rod 20 in a common manner. Crossover shaft 26 is connected between jacks 16 to allow both rods 20 to move simultaneously. It should be noted that screw jacks 16 are items common in this art and are illustrated for descriptive purposes only. Any suitable lifting mechanism can be employed in place of screw jacks 16 without departing from the teachings of this invention.

A roller frame, generally designated by reference numeral 28 is fixedly connected to rods 20. Roller frame 28 houses tension rollers 84, 86, 38 and 40. Generally, rollers 34, 36 will be either formed from a different material than or will be of a different diameter than rollers 38 and 40 so that at least two different types, grades or gauges of steel can be accommodated by machine 10. In the example shown in the drawings, rollers 34 and 36 are of a larger diameter than rollers 38 and 40 and can accommodate thicker gauge steel. Other types of rollers 34, 86, 38, 40 are possible, dependent upon the type of steel being processed.

Roller frame 28 is generally of the three piece construction shown and includes main roller frame 42 and roller frames 44 and 46. Rollers 36 and 38 are rotatably connected to main roller frame 42 through bearings 48 and 50, respectively, while pivoting roller frames 44 and 46 house rollers 34 and 40, respectively which are rotatably connected thereto by bearings 52 and 54. Pivoting roller frame 44 is pivotally connected to main roller frame 42 by bearing 56, with pivoting roller frame 40 connected to the main roller frame by bearing 58. A lifting device, illustrated as a pair of hydraulic cylinders 60 is connected between main roller frame 42 and pivoting roller frame 44. Similarly, a lifting device shown as a pair of hydraulic cylinders 62 is connected between roller frames 42 and 46. Cylinders 60, 62 serve to adjust the relative positioning of rollers 34-40 to accommodate varying thicknesses of slit material 12 which passes through the rollers.

Machine 10 also includes drive mechanism, referred to generally by reference numeral 64, attached to main frame 14 through support 66. Drive mechanism 64 is a common item in the slitting industry and includes dual spaced shafts 68 and 70 operatively connected to a set of rollers 34, 86 (FIG. 1) or 38, 40 (FIG. 3) through couplings 72 and 74, respectively Both shafts 68 and 70 include telescoping shaft parts 76, 78 which are slidably connected and held in position by collar 80. Shafts 68 and 70 are connected to couplings 72, 74 through universal joints 82 and 84, respectively.

Each shaft 68, 70 is supported by a bracket 69 and connected via a universal joint 86, 88 to a brake mechanism 90, 92 respectively. Each brake mechanism 90, 92 includes a common brake housing 94, 96 and a brake shaft 98, 100 connected to shaft 68, 70 through coupling 102, 104 and universal joints 86, 88. Bearings 110, 112 house rotatable brake shafts 98, 100 as shown.

A sprocket 114 is connected to coupling 104. Motor 116 is connected to support 66 and has its drive shaft 118 extending through clutch 124 and pillow block 126 and connected to a sprocket 120 aligned with sprocket 114. A chain 122 is connected between sprockets 114, 120 and serves to transmit rotational movement of drive shaft 118 to shaft 70 and henceforth to rollers 36 or 40. Motor 116 is of common construction, usually hydraulically driven.

It should be understood that the following description of the operation of machine 10 is intended to illustrate its use with the particular set of tension rollers 34, 36, 38, 40 shown. Any combination of tension rollers may be used in conjunction with machine 10 dependent upon the type, size and grade of slit material 12 without deviating from the teachings of this invention.

Figure 2:
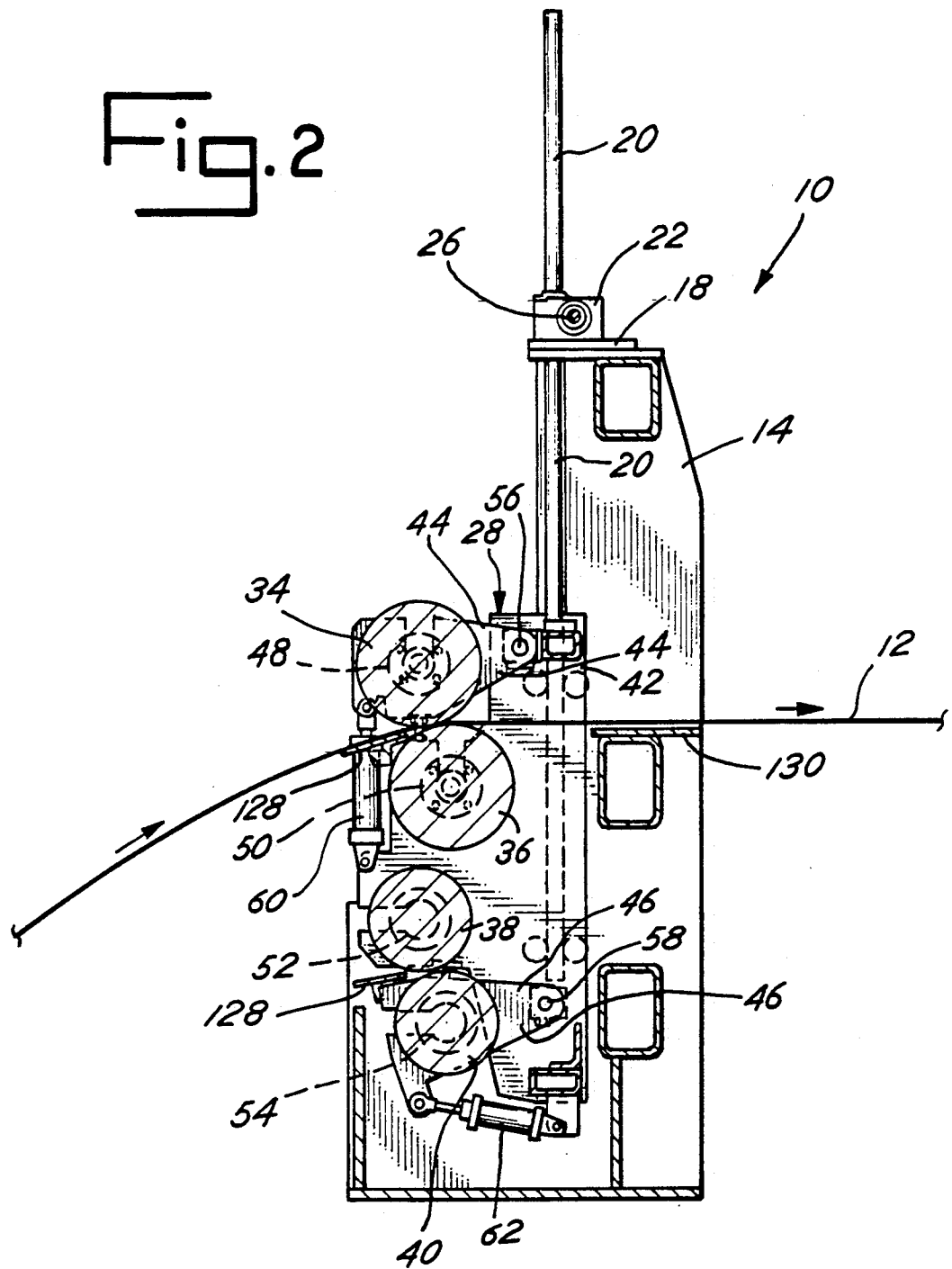
FIG. 2 is a sectional view of the machine in operation, as taken along line 2—2 of FIG. 1.
Figure 3:
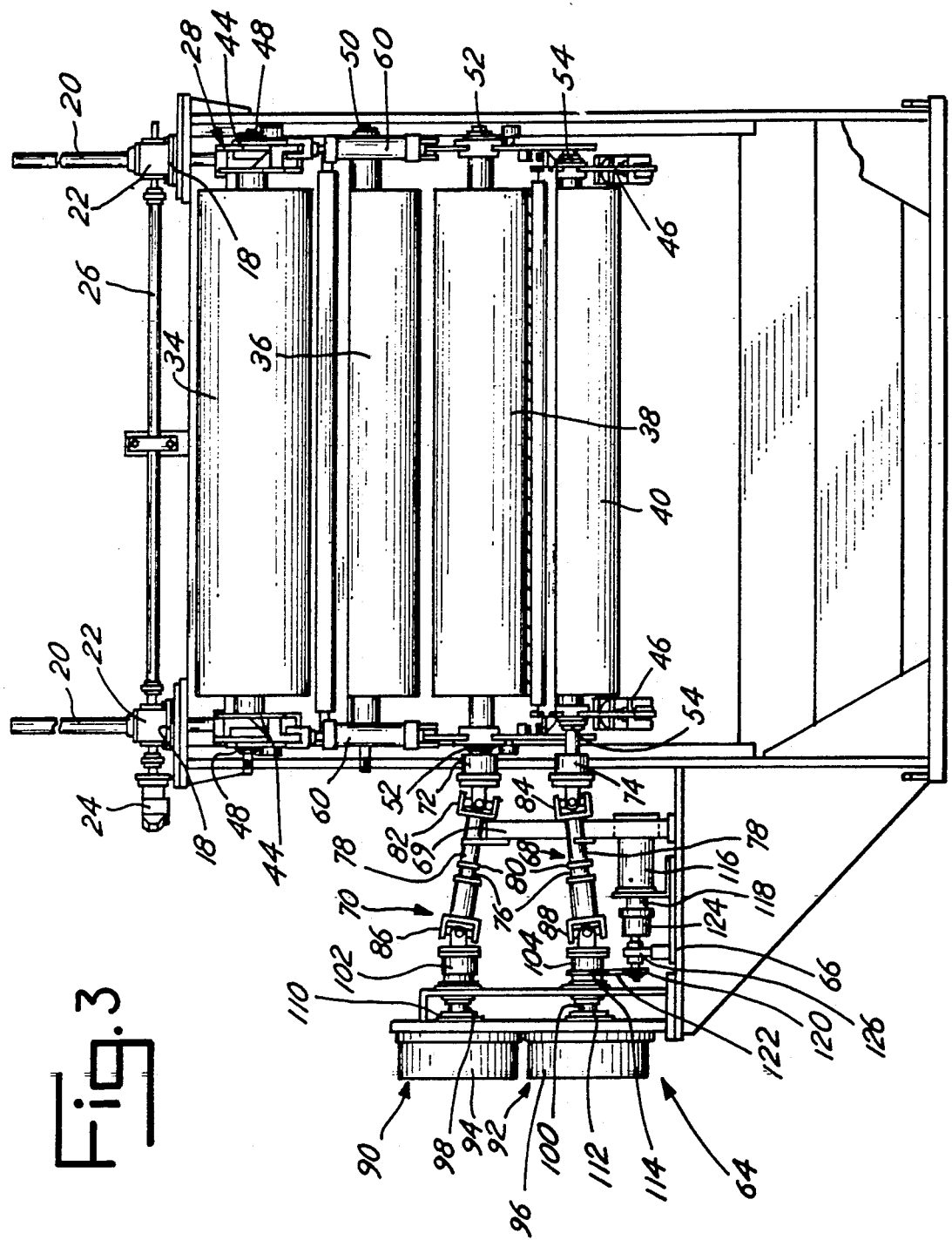
FIG. 3 is an end view similar to FIG. 1 with the other set of tension rollers in an operating position.

FIGS. 1–3 illustrate machine 10 with tension rollers 34, 36 in the operating position. Rollers 34, 36 are illustrated as sixteen inch diameter rollers and are generally used to tension heavier gauge steel. After feeding a small quantity of slit material 12 (which rests on table 128) over roller 36, pivoting frame 44 is pivoted until roller 34 contacts the slit material applies pressure thereto. Motor 116 is then activated to rotate rollers 34, 36 as above described to advance material 12 to a recoiler (not shown). As the material 12 is fed through rollers 34, 36 to the recoiler (not shown) brakes 90, 92 are activated to transmit torque through drive shafts 68, 70 to the rollers. Coupled with the nip pressure applied to material 12 by rollers 34, 36, this torque force tensions the slit material prior to its reaching the recoiler (not shown) Material 12 slides across table 130 as it exits rollers 34, 36 under tension.

When lighter gauge material is to be tensioned by machine 10, couplings 72, 74 are disconnected from rollers 34, 36 and screw jacks 16 are activated to raise roller frame 28 until rollers 38, 40 (shown as thirteen inch diameter rollers) are in the operating position of FIG. 3. Slit material 12 is then tensioned and fed to the recoiler (not shown) in the same manner as described above.

It is understood that the above description is not limited by the above-given details, but may be modified within the scope of the following claims.

We claim:

1. A tensioning machine positioned along a metal slitting line, said machine constituting means for maintaining tension of slit metal, said machine comprising a main frame, a second frame slidably mounted to said main frame, first and second sets of rotatable tension rollers carried by said second frame, adjustment means connecting each first and second set of tension rollers wherein said first set of tension rollers is in an operating position and engages slit material to apply tension to the slit material prior to recoiling, said second set of tension rollers in a standby position, and drive means for rotating said first set of tension rollers when in the operating position, and means for shifting said second frame relative to said first frame wherein the first set of tension rollers is in a standby position with the second set of tension rollers in said operating position.

2. The tensioning machine of claim 1 wherein said first set of tension rollers is formed from a material different from material forming said second set of tension rollers.

3. The tensioning machine of claim 1 wherein said first set of tension rollers are of a larger diameter than the diameter of said second set of tension rollers.

4. The tensioning machine of claim 1 wherein said first set of tension rollers includes a first roller rotatably mounted to said second frame, a roller frame pivotally connected to said second frame a second roller rotatably connected to said roller frame, and means for pivoting said roller frame and second roller relative to the first roller to compensate for varying thicknesses of said slit material.

5. The tensioning machine of claim 4 wherein said second of tension rollers includes a first roller rotatably mounted to said second frame, a roller frame pivotally connected to said second frame, a second roller rotatably connected to said roller frame, and means for pivoting said roller frame and second roller relative to the first roller to compensate for varying thicknesses of said slit material.

6. The tensioning machine of claim 5 wherein each means for pivoting includes a power driven hydraulic cylinder.

7. The tensioning machine of claim 1 and brake means associated with said drive means, said brake means for selectively stopping rotating of the drive means.

8. The tensioning machine of claim 1 wherein said adjustment means includes screw jacks connected to said second frame.

* * * * *